United States Patent [19]
Dannoux

[11] Patent Number: 5,810,968
[45] Date of Patent: Sep. 22, 1998

[54] DEVICE FOR THE ASSEMBLY OF THE ENDS OF OPTICAL FIBERS INTO A SHEET

[75] Inventor: Thierry I. Dannoux, Avon, France

[73] Assignee: Corning Incorporated, Corning, N.Y.

[21] Appl. No.: 647,212

[22] Filed: May 9, 1996

Related U.S. Application Data

[62] Division of Ser. No. 383,758, Feb. 2, 1995.

[30] Foreign Application Priority Data

Feb. 9, 1994 [FR] France ................................. 94 01458

[51] Int. Cl.⁶ .................................. B30B 7/00; B32B 1/00
[52] U.S. Cl. ..................... 156/580; 156/583.1; 156/556; 156/560; 156/293; 385/135; 385/58; 385/95; 385/97; 269/43; 269/156; 269/296
[58] Field of Search ................................. 156/293, 298, 156/264, 256, 153, 158, 159, 304.2, 296, 271, 49, 55, 316, 580, 583.1, 267; 385/137, 136, 97, 95, 134, 135, 58, 147; 65/406; 269/43, 903, 296, 156

[56] References Cited

U.S. PATENT DOCUMENTS

| | | | |
|---|---|---|---|
| 1,501,289 | 7/1924 | Moser | 269/296 |
| 3,783,065 | 1/1974 | Stone | 156/159 |
| 3,860,405 | 1/1975 | Coucoulas et al. | 385/95 |
| 4,109,369 | 8/1978 | Taylor | 385/98 |
| 4,227,951 | 10/1980 | Mignien | 156/159 |
| 4,345,137 | 8/1982 | Mignien et al. | 269/903 |
| 4,424,174 | 1/1984 | Howarth | 385/134 |
| 4,562,632 | 1/1986 | Parchet et al. | 269/903 |
| 4,818,059 | 4/1989 | Kakii et al. | 385/95 |
| 4,867,524 | 9/1989 | Courtney et al. | 385/95 |
| 5,035,766 | 7/1991 | More et al. | 156/580 |
| 5,155,900 | 10/1992 | Grois et al. | 269/296 |
| 5,194,105 | 3/1993 | Nguyen | 269/903 |

*Primary Examiner*—David A. Simmons
*Assistant Examiner*—Linda L. Gray
*Attorney, Agent, or Firm*—William J. Chervenak

[57] ABSTRACT

A device for assembling ends of optical fibers into a sheet. Each of the ends is stripped of any resilient coating and has a flat terminal face. A grooved substrate is supported on a cradle means. An adhesive dispensing means deposites adhesive into the grooves. A gripping means grips the optical fibers to form the ends into a sheet and positions each of the optical fibers into the grooves of the substrate. A portion of each of the optical fibers, including the ends, extends beyond an edge of the substrate. A means holds a plate, having a flat surface, against the substrate where the plate covers the grooves to hold the optical fibers in the grooves and where the plate bonds to the substrate. The flat surface extends beyond the edge of the substrate to cover the portion of each of the optical fibers extending beyond the edge of the substrate. A means for pressing presses the portion of each of the optical fibers extending beyond the edge of the substrate against the flat surface of the plate until the adhesive hardens.

2 Claims, 2 Drawing Sheets

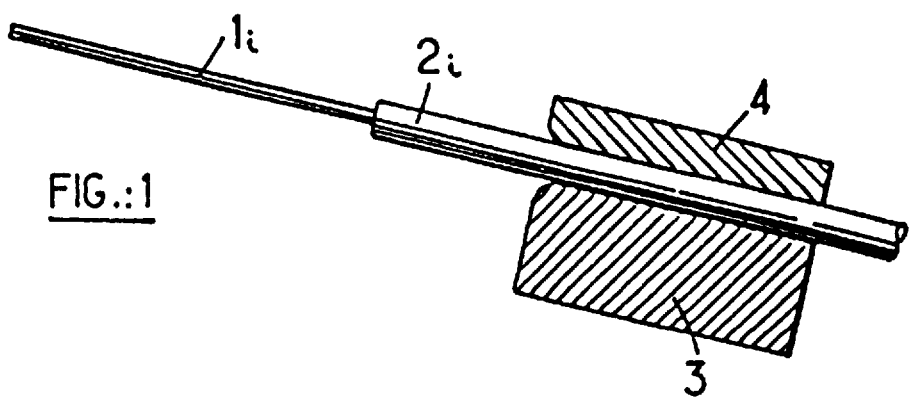
FIG.:1
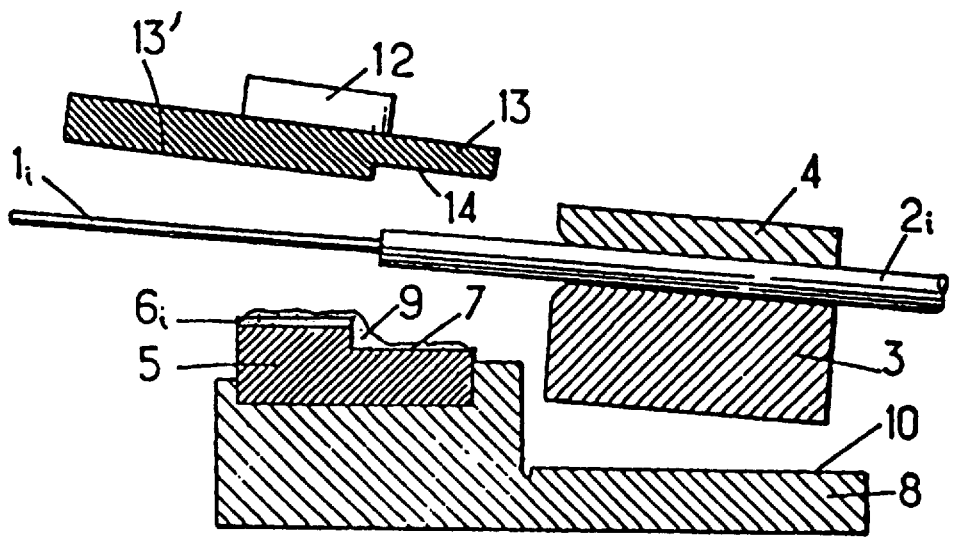
FIG.:2
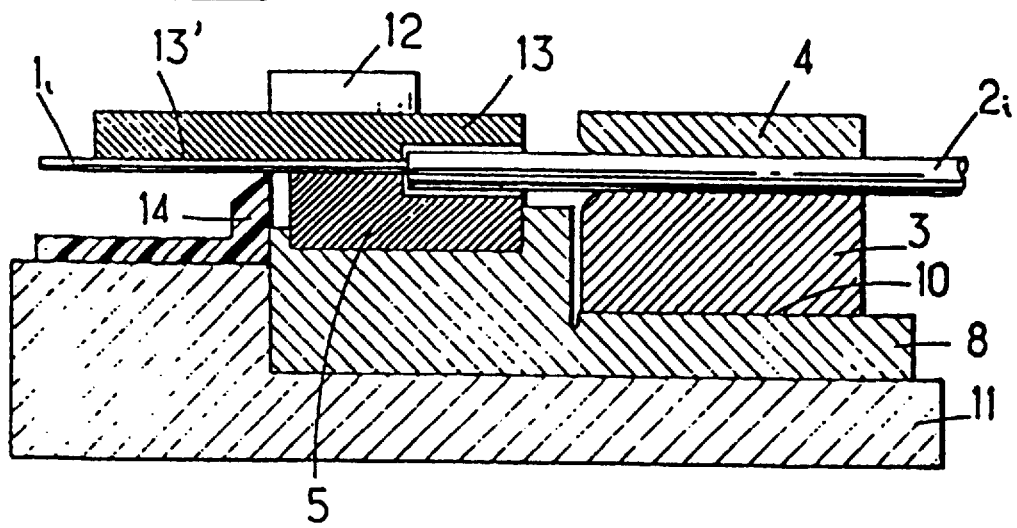
FIG.:3

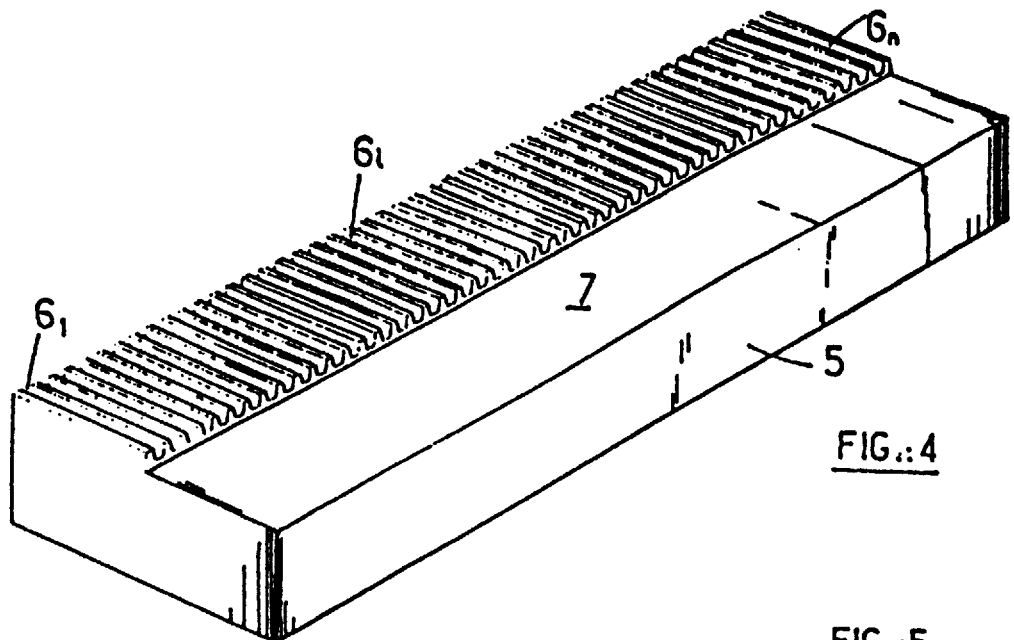
FIG.: 4
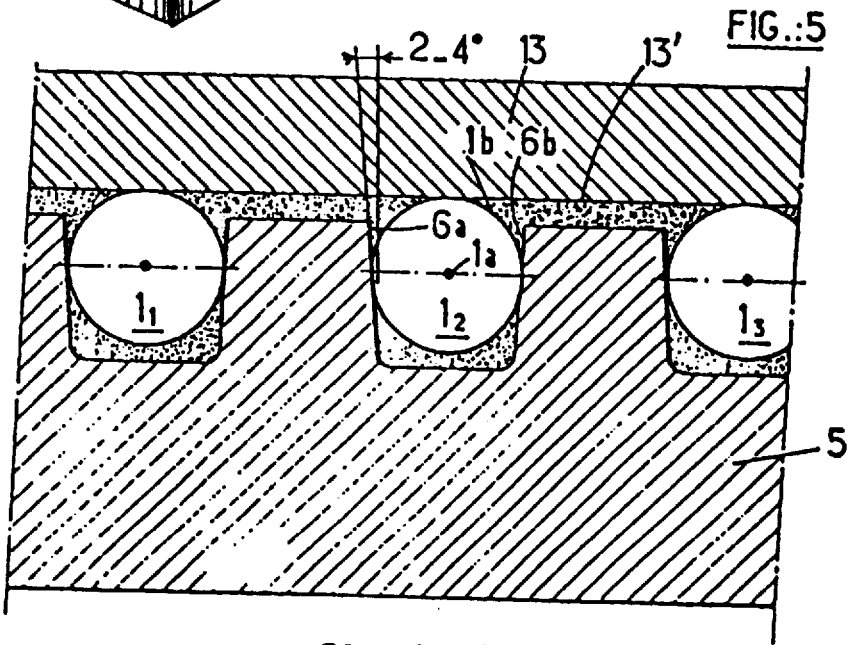
FIG.: 5
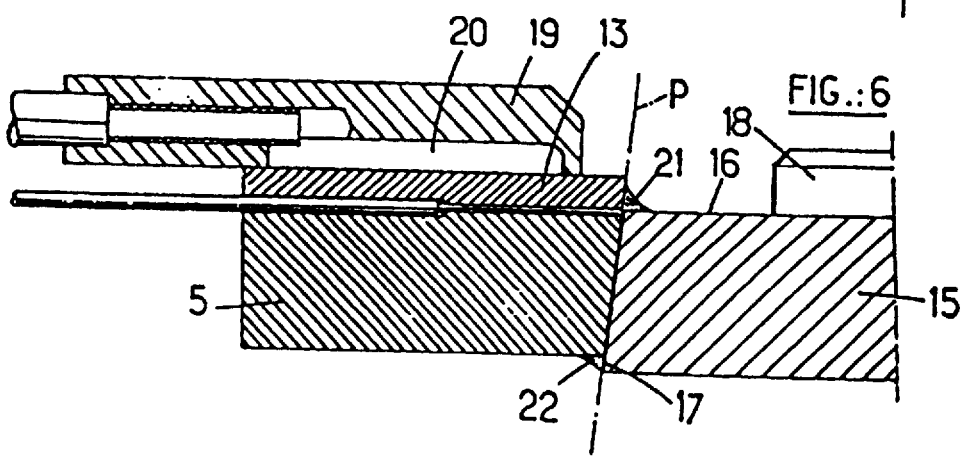
FIG.: 6

DEVICE FOR THE ASSEMBLY OF THE ENDS OF OPTICAL FIBERS INTO A SHEET

CROSS-REFERENCE TO RELATED APPLICATIONS

This is a division of application Ser. No. 08/385,758, filed Feb. 2, 1995.

BACKGROUND OF THE INVENTION

1. Field of the Invention

The present invention relates to a procedure and device for the assembly of the ends of optical fibers arranged in the form of a sheet and, more specifically, to such a procedure and such a device that allow the assembly of such fiber sheets in order to connect them to integrated optical components.

2. Description of Related Art

Such components include waveguides integrated in a substrate, for which the ends of these waveguides need to be connected to optical fibers. For example, a coupler with m inputs and n outputs is connected to sheets of fibers that contain m fibers and n fibers, respectively. In accordance with a first procedure used to achieve this connection, the axis of the end of each fiber is attached and aligned, by micromanipulation, with the axis of the end of the corresponding waveguide, and the respective positions of these ends are stabilized with the aid of an adhesive product.

This procedure, which requires the micromanipulation of each of the fibers, is obviously a long and therefore costly procedure.

In order to speed up the connection operations, it has been proposed that the corresponding ends of a fiber sheet be unified beforehand, in accordance with a configuration that conforms to the configuration of the ends of the waveguide in the integrated optical component, and then connecting simultaneously, by means of a single glueing operation, the ends of the fibers and the corresponding guides.

This proposal raises the difficulty of the preceding unification of the ends of the fibers, in such a way that these ends are aligned in a rectilinear way in accordance with a positioning arrangement that is not subject to deformation, with a spacing that is consistent with that of the ends of the waveguides to which the ends of the fibers are to be connected.

For this purpose, it has been proposed that these ends be positioned in parallel grooves in a substrate, with the spacing of these grooves being identical to that of the ends of the waveguides. In this context, a substrate with grooves that have a V-shaped cross section is known, in which each fiber rests against the two sides of the groove that receives it, with the overall assembly of these grooves being covered by a plate glued to the substrate in contact with the fibers.

This structure allows the desired rapid assembly to be obtained. However, it has the disadvantage of being hyperstatic as soon as is used to assemble more than two fibers. The presence of a parasitic particle between a fiber and one side of a groove, or between a fiber and the plate, can then interfere with the perfect alignment of the ends of the fibers in the sheet thus formed. A fault in the alignment of any one of the fibers also perturbs equally the alignment of the other fibers. With fiber sheets assembled in this way, the manufacturing defect rate is high, with a resulting increase in manufacturing costs.

Consideration has also been given to the idea of guiding the fibers through aligned circular channels in a single substrate, then immobilizing the fibers in these channels through the application of an adhesive. Unfortunately, because the diameter of such channels must be larger than that of the fibers, such an assembly is necessarily hypostatic. Consequently, neither the alignment nor the coplanarity of the assembled fibers can be ensured.

The use has also been proposed of substrates with grooves that have an essentially rectangular cross section, at the bottom of which the fibers are affixed by glueing. In this case, the grooves must be significantly wider than the diameter of the fibers, in order to allow the fibers to be applied against the bottom of the grooves, to the detriment of the transverse guiding of the fibers. Furthermore, a parasitic particle located between a fiber and the bottom of a groove can cause the pivoting of a pressure plate on the portion of the fiber that is located outside the groove, to the detriment of the regularity of the embedding of the other fibers in their respective grooves.

SUMMARY OF THE INVENTION

Thus, the goal of the present invention is to provide a procedure and a device that make it possible to preassemble, in line and with precision, the ends of several optical fibers arranged in the form of a sheet, with a low manufacturing defect rate and therefore with reduced manufacturing costs that are compatible with the financial constraints imposed on high-volume industrial production.

This goal of the invention, along with others that will become clear through a reading of the following description, is achieved through a procedure for the assembly of ends of optical fibers arranged in the form of a sheet, in accordance with which an adhesive product in the liquid state is deposited in a plurality of equidistant and parallel rectilinear grooves formed in one flat surface of a substrate; each of the stripped ends of the fibers in the sheet is introduced into a corresponding groove; and the ends of the fibers are held in the grooves with the aid of a plate that is affixed to the grooves. This procedure is noteworthy in that, because the adhesive product is still in liquid form, the group of fiber ends extending from the grooves are pressed against a facing flat portion of the plate that extends from the substrate, and in that this pressure is maintained until the adhesive product hardens and the plate is glued.

Thus, the flat portion of the plate constitutes, for the group of assembled fibers, a reference surface that ensures excellent alignment of the fibers, as a result of the planarity of the said portion.

In accordance with another characteristic of the invention, the transverse positioning of each fiber in its groove is ensured by its contact with two flanks of this groove along planes that are perpendicular to the surface of the substrate in which the groove is formed. Thanks to this transverse guiding, the spacing of the fibers and the regularity of this spacing can be determined with precision.

To implement the procedure in accordance with the invention, a device is used that includes:

a) A cradle that receives the grooved substrate;

b) Means for depositing an adhesive product, in the liquid state, in the grooves of the substrate;

c) Means for placing the stripped ends of the optical fibers in a sheet of such fibers in the grooves in which the adhesive product has been deposited;

d) Means for covering the grooves in which the adhesive product has been deposited and the fibers with a plate, and for holding this plate against the substrate; and e) Means for pressing the group of ends of the fibers extending from the grooves against a facing flat portion of the plate that extends from the substrate until the adhesive product hardens.

The above-mentioned pressure means advantageously include a lip made of an elastic material located close to and transversely in relation to the ends of the fibers that extend from the substrate, and means for shifting the position of this lip between a first position that is distanced from the said ends and a second position in which the lip presses the ends against a flat surface of the plate. Thus, the procedure in accordance with the invention makes it possible to obtain fiber sheets that are assembled with the aid of a substrate that includes a plurality of equidistant, coplanar, and parallel grooves, each of which is provided with a hardened adhesive product and with the stripped end of one of the fibers, and a plate glued against at least the grooved portion of the substrate, with the above-mentioned stripped ends of the fibers all being distanced from the bottom of the grooves and applied against a flat portion of the plate glued against the substrate, with said flat portion thus defining the depth to which the fibers are embedded within their respective grooves.

Other characteristics and advantages of the present invention will become clear from a reading of the following description and an examination of the attached drawings, in which:

BRIEF DESCRIPTION OF THE DRAWINGS

FIGS. 1 to 3 illustrate several successive stages in the assembly procedure in accordance with the invention;

FIG. 4 is a perspective view of a grooved substrate used in the procedure in accordance with the invention;

FIG. 5 is a schematic cross-sectional view of the fibers assembled in accordance with this procedure, which is useful in connection with the description of the procedure; and FIG. 6 is a diagram that illustrates the connection of the leading edge of a sheet of fibers, assembled in accordance with the invention, to an integrated optical component.

DESCRIPTION OF PREFERRED EMBODIMENTS

Reference is made to FIGS. 1 to 3 in the attached drawings, in which FIG. 1 illustrates a preliminary stage in the assembly procedure in accordance with the invention, in which a sheet of n optical fibers [$1i$] (where i=1 to n) is formed under a protective coating [$2i$], by arranging the ends of a plurality of such fibers (for example, up to several hundred fibers) parallel to one another in a single plane and by temporarily stabilizing the ends of the fibers by pressing the assembly between two blocks [3][4] that extend over the entire width of the fiber sheet thus formed. Each optical fiber end has flat terminal face. Preferably, one of the blocks includes parallel coplanar grooves (not shown), whose spacing is essentially the same as the spacing in accordance with which the ends of the fibers are to be assembled, with each groove receiving a fiber under the protective coating and with the other block closing the groove. Temporary assembly means (not shown) hold the two blocks [3][4] against each other, thereby forming a sheet-holder that allows subsequent manipulations of the sheet. As shown in FIG. 1, the ends of the fibers [$1i$] are then stripped through the removal of part of the protective coating [$2i$] near the end of each fiber.

In accordance with the invention, the stripped ends of the fibers are then introduced and affixed within the parallel and equidistant grooves formed on one surface of a substrate [5] in the form of a small bar, as shown in a perspective view in FIG. 4 and in a cross-sectional view in FIGS. 2 and 3. As shown in FIG. 4, the support includes a plurality of rectilinear grooves [$6_1$] [$6_2$] etc., in a quantity equal to the number of fibers to be assembled, and a step [7] designed to hold an adhesive intended to affix portions of protective coatings for the fibers adjacent to the stripped ends of these fibers, as explained below.

Returning now to FIG. 2, it can be seen that the substrate [5] is located in a holding cradle [8]. When the fiber sheet is manipulated with the aid of the sheet-holder [3][4], all of the fibers [$1i$] are simultaneously introduced into the corresponding grooves [$6i$] in the substrate [5], which grooves were coated beforehand with an adhesive product [9] in the liquid state. The cradle has a support surface [10] for the sheet-holder [3] [4], with this support surface being positioned in such a way that the axes of the ends of the fibers are essentially coaxial with the corresponding grooves [$6i$] when the sheet-holder is placed on said surface [10], as shown in FIG. 3.

FIG. 3 is a schematic view of all of the means that make up the device necessary for the implementation of the procedure in accordance with the invention. Thus, the device includes, in addition to a reception base plate [11] for the cradle [8], means (not shown) for coating the grooves [$6i$] of the substrate [5] with an adhesive product [9] in the liquid state, means for manipulating the sheet-holder [3] [4] in order to place the stripped ends of the fibers in the sheet in the grooves coated with the adhesive product, and means [12] for subsequently covering the grooves [$6i$] with a plate [13] in such a way as to hold the fibers in the grooves. The means [12] press the plate [13] against the support [5] with a force sufficient to establish a layer of adhesive between the plate [13] and support [5] having a thickness of about 20 microns.

In accordance with an important characteristic of the device in accordance with the invention, the device also includes a lip [14] that extends transversely in relation to the fiber sheet, to the right of the stripped portions of these fibers located facing a flat portion [13'] of the surface of the plate [13] that extends from the substrate [5]. Means (not shown) allow this lip to be shifted selectively between a first position in which the lip is distanced from contact with the fibers and a second position (shown in FIG. 3) in which the lip [14] simultaneously presses the assembly of fibers [$1i$] against the flat portion [13'] of the cover plate [13], which is held immobile against the substrate [5] by means [12].

In accordance with the invention, this device is used to assemble the ends of the fibers in precise, rigidly fixed positions in relation to one another, in accordance with a rectilinear alignment and in accordance with a spacing consistent with that of the ends of the waveguides formed in an integrated optical component. To do so, after the ends of the fibers [$1i$] have been passed through grooves [$6i$] that have been coated with an adhesive product in the liquid state, and after the substrate [5] has been covered with the plate [13] and the said plate [13] has been pressed and held in the covering position, the lip [14] is actuated so that it shifts into its second position, while the adhesive product with which the groove has been coated is still liquid. Then the lip is held pressed against the fibers until the adhesive hardens, with the fibers being pressed by the lip [14] against the flat portion [13'] of the plate [13]. Once the adhesive had hardened, the ends of the fibers [$1i$], in association with the substrate and the plate [13], form a rigid block in which the fibers are very precisely positioned in relation to one another, as will now be explained in connection with an examination of FIG. 4.

This figure shows a portion of a cross-sectional view of the grooved substrate [5]; the plate [13]; and the grooves [6$_1$] [6$_2$] [6$_3$] of the substrate, provided with the fibers [1$_1$] [1$_2$] [1$_3$]. The adhesive product fills the space between the walls of the grooves and the fibers, on the one hand, and the space between the plate [13] and the substrate [5], on the other hand.

A fiber conventionally consists of a central core [1a] and a peripheral sheath [1b] which, in accordance with the invention, rest on the one hand on the flat portion [13'] of the plate [13] and, on the other hand, on two sides [6a] [6b] of the corresponding groove, essentially perpendicular to this surface. As an example, in the case of a single-mode fiber, the diameter of the core of the fiber can be 10 μm and the diameter of the sheath can be 125 μm. The sheath can be surrounded, rather than by a groove, by a protective coating 250 μm in diameter, equal to the spacing of the grooves [6i] in the substrate [5]. The contact between a fiber and the flat portion [13'] of the plate [13] and the two sides [6a] [6b] of a groove in accordance with the invention ensures the accurate positioning of the fibers in relation to one another, in accordance with the two degrees of freedom of the fibers in the plane of the section shown in FIG. 2.

In fact, because all of the fibers rest against the flat portion [13'], they are aligned perfectly parallel to the surface of this flat portion, and are distanced from the bottoms of the grooves, which therefore do not determine their alignment. Furthermore, in accordance with an advantageous characteristic of the invention, the grooves are slightly everted outwardly, with their sides being deflected by 2 to 4 angular degrees, for example, from a plane perpendicular to the surface [13']. When the fibers are immersed in the liquid adhesive in the grooves, they penetrate the adhesive at the largest portion of the groove, thus forcing toward the sides of the groove the liquid adhesive that rises from the bottom of the groove as a result of the immersion of the fiber. This adhesive-channeling effect results in a pre-centering of the fiber in the groove, with the flanks of the groove guiding the descent of the fiber into the groove. The width of the openings of the grooves is slightly greater than the diameter of the fibers, and the inclination of the flanks is such that the fibers can descend into the grooves when they are introduced into the grooves, while being guided by the sides during this descent and also during their reascent (if any) as caused by the pressure of the lip [14] that brings the fibers into contact with the flat surface [13'] of the plate [13].

Thus, the fibers can be positioned accurately in accordance with their two degrees of freedom in relation to the sides [6a] [6b] of the grooves and in relation to the flat portion [13'] of the plate [13]. The conformance of this position with that of the ends of the waveguide in an integrated optical component is therefore essentially a function of the accuracy with which the planarity of the portion [13'] of the plate [13] and the transverse positioning of the sides [6a] [6b] of the grooves in the substrate [5] are assured.

In this regard, the plate may be made of glass, because today it is known how to obtain a surface on such a plate that has a planarity equal to or greater than 0.5 μm per cm.

To create the substrate [5] shown in FIG. 4, a block of glass can advantageously be utilized whose thermal expansion coefficient is identical or close to that of the glass plate, and in particular a block made of FOTOFORM (registered trademark) photosensitive glass, as described in the catalogues of applicant's company. On the flat surface of such a block, for example, with a 3 mm×6 mm cross-section and with a step 7 mm×3 mm wide, in accordance with conventional means and with the aid of a photosensitive resin, a mask can be formed that reproduces accurately the form and spacing of the openings of the grooves [6i] on this surface. Then, by exposing the masked surface to ultraviolet radiation, the unmasked portions are ceramicized to a certain depth. These unmasked portions are then ready for chemical milling through treatment with hydrofluoric acid, which creates grooves in the ceramicized portions. In this way everted grooves are obtained whose flanks are inclined at an angle of approximately 2 to 3 degrees, which, as noted above, is advantageous.

With the aid of a substrate manufactured in this way, the assembly procedure in accordance with the invention takes place as described below. First, a certain number of fibers (for example, 108) are placed in a protective coating in a sheet-holder [3] [4] at a spacing of, for example, 250 μm. The ends of the fibers [1i] are then chemically stripped and then inserted simultaneously into grooves [6i], previously coated with adhesive, in the substrate [5]. The adhesive-coated grooves are then covered with a plate [13] and held in position with the aid of means [12], thereby forming a flexible pressor. In this position, the adhesive product is subjected to polymerization under ultraviolet radiation, for approximately one minute at a temperature of 20 degrees C, at the recommended wavelength. Then the ends of the fibers [6i], the plate [13], and the substrate [5] are appropriately assembled rigidly in relation to one another.

This way, it has been possible to assemble groups of more than 100 fibers with spacing of 250±0.3 μm, using single-mode fibers whose sheath-to-core concentricity is better than 0.1 μm. In this assembly, the grooves in the substrate, where they come into contact with the fibers, have a width of 125±0.5 μm and a depth of 120±3 μm. The center of the fibers is located approximately 40 μm from the surface of the substrate [5]. A layer of adhesive approximately 20 μm thick thus separates this surface from the surface of the facing flat portion [13']of the plate [13]. Such a thickness is sufficient to prevent the delamination of the plate, when the adhesive product consists of an epoxy resin that undergoes radical polymerization when exposed to ultraviolet radiation. An adhesive layer from 0 to 0.5 μm thick separates each fiber from each of the adjacent walls [6a] [6b].

In particular, as shown in FIG. 2, the plate [13] has a step [14] that faces the step [7] of the substrate [5] during the assembly procedure. The ends of the protective coatings of the fibers near the stripped ends of the fibers are then held between these two steps, which are thus separated by a distance that is essentially equal to the diameter of the protective coatings. The step [7] (as shown in FIG. 2) and, optionally, the step [14] can be provided with adhesive beforehand, in order to ensure the immobilization of the protective coatings [2i] between these steps.

The resulting block should then be cut or sectioned along a cross-sectional plane [P], as shown in FIG. 6, facing the surface of the substrate [5] from which the stripped fibers extend. The plate [P] is inclined by approximately 6 to 15 degrees from a plane perpendicular to the axes of the fibers in the substrate grooves, for a reason indicated below.

The cutting or sectioning of the block [5], the fibers [1i], and the plate [13] is followed by the polishing of the cutting plane, with a view toward the connection of the leading edge of the sheet thus formed to an integrated optical component [15]. This connection is achieved in accordance with the procedure shown schematically in FIG. 6. The sheet-holder [3] [4] can be disengaged beforehand from the fiber sheet and may optionally be replaced by a flexible protective strip.

As an example, the surface [16] of the component [15] includes a plurality of waveguides embedded for example in accordance with a known ion-exchange technique involving a mask. Before the connection is made, the surface [17] of the component [15] to be applied to the cut and polished surface of the leading edge of the sheet is itself cut along a counter-inclined cross-sectional plane, so as to allow the in-line connection of the fibers in the sheet and the corresponding waveguides in the component [15]. Thus, because this component is held by a pressor [18] against a cradle (not shown), the leading edge of the sheet [5] [1$i$] [13] is affixed to an arm [19] that has an aspiration chamber [20] that is kept under a vacuum by means of a connection to a vacuum source (not shown). The arm is part of a micromanipulation device that allows the leading edge of the sheet to be brought very accurately into position against the surface [17] of the component [15], so as to center the axes of the ends of the fibers on the axes of the corresponding ends of the waveguides. Once an optimal positioning has been achieved, the leading edge of the sheet is affixed in the plane [P] against the component [15] with the aid of a suitable adhesive product, which is applied in the form of two transverse beads [21] [22]. These operations are repeated with another fiber sheet at the other ends of the waveguides in the components, in order to form an integrated optical component that is provided with all of the fibers necessary for the connection of its inputs and outputs to other components in an optical device that includes the said component.

The operations for centering the fibers on the corresponding waveguides of the integrated optical component take place, in accordance with the invention, through the optimization of a light power that is then transmitted from the waveguides to the fibers, or vice versa, through their facing ends. Advantageously, in accordance with the invention, the passing light flows are optimized, during the centering operation, in the fibers located at the two edges of the sheet and in the corresponding waveguides. Measurements have made it possible to determine that this procedure also results in excellent centering of all of the intermediate fiber/waveguide pairs.

The connection of the leading edge of the sheet [5] [1$i$] [13] with the integrated optical component [15], along the plane [P] inclined by 6 to 15 degrees in relation to the axis of the fibers, makes it possible to minimize the magnitude of parasitic light reflections at the ends of the fibers and guides, on both sides of the adhesive that joins them. Otherwise these reflections would cause the return, along the axis of these fibers and guides, of optical signals that could perturb the useful signals to be transmitted, particularly in the case of single-mode fibers and waveguides.

It now appears that the present invention allows the desired goal to be reached, i.e., to acquire a procedure for the assembly of fibers in a sheet that allows the stripped ends of these fibers to be joined integrally, in accordance with an exact rectilinear alignment and accurate spacing, so that the fibers can be connected to an integrated optical component. The assembly operations lend themselves to automation, do not require micromanipulations on the fiber level, and therefore are rapid. The procedure allows large fiber sheets to be formed that can include as many as 400 or more fibers, for example, and which can then be subdivided on demand, by cutting, so that individual sub-assemblies can be obtained that contain 4, 8, 16, etc., fibers, for example, as necessary for example for connections with couplers that have a corresponding number of outputs.

This subdivision makes it possible to eliminate sub-assemblies that have at least one fiber with faulty alignment. Faulty alignment can be caused by the presence of a foreign particle between a fiber (for example, fiber [12] in FIG. 5) and the surface of the flat portion [13'] of the plate [13]. In such a case, the fiber [1$_1$] is embedded more deeply in its groove than the adjacent fibers are, and therefore displays faulty alignment. In this regard, it should be noted that a fault of this type in fiber [1$_2$] does not have any repercussions on the positioning of the adjacent fibers. Therefore, if several individual fiber sub-assemblies are obtained by cutting the fibers, only the sub-assembly that contains the misaligned fiber needs to be rejected, contrary to what happens in the so-called "hyperstatic" assembly procedures in the prior art, as described in the introduction to the present specification. As a result, the productivity of the procedure in accordance with the invention is clearly greater than that of the procedures in the prior art, inasmuch as the fibers in the rejected sub-assemblies can be recovered and used, for example, in the inputs of 1-to-N couplers.

Of course, the invention is not limited to the embodiment described and represented here, which has been offered only as an example. Thus, the flexible lip [14] may consist of a metal filament sheathed inside a tube of flexible material, with the assembly being mounted on a fixture that is caused to pivot in order to shift the lip from one to another of these two positions. Likewise, materials other than mineral materials can be selected to form the substrate [5] and the plate [13]. For instance, the grooves [6$i$] can be milled chemically in a block of a metal alloy, for example, whose thermal expansion coefficient is close to that of glass. The adhesive product utilized can be charged with 0.3 $\mu$m particles of silica in order to increase its viscosity and to decrease the thermal expansion coefficient of the adhesive, and optimally to bring it close to that of glass. Furthermore, the invention is not limited to the assembly of single-mode fibers in the form of a sheet, and of course is also applicable to assemblies of multi-mode fibers. Similarly, procedures other than photolithography, such as for example ion-beam cutting or etching, can be used to form the grooves in the substrate

We claim:

1. A device for assembling ends of optical fibers into a sheet, each of the ends being stripped of any resilient coating and having a flat terminal face, the device comprises:
    a) a grooved substrate having a plurality of grooves on a surface thereof;
    b) a cradle means for supporting the substrate;
    c) a dispensing means for depositing an adhesive, in the liquid state, into the grooves of the substrate;
    d) a means for gripping the optical fibers at a location behind the ends to form the ends into a sheet and for positioning each of the optical fibers into the grooves of the substrate, with one optical fiber per groove, where a portion of each of the optical fibers, including the ends, extends beyond an edge of the substrate;
    e) a means for holding a plate against the substrate where the plate covers the grooves to hold the optical fibers in the grooves and where the plate bonds to the substrate, the plate having a flat surface which extends beyond the edge of the substrate to cover the portion of each of the optical fibers extending beyond the edge of the substrate; and
    f) a means for pressing the portion of each of the optical fibers extending beyond the edge of the substrate against the flat surface of the plate until the adhesive hardens.

2. The device of claim 1 characterized by the means for pressing further including a lip, made of a flexible material, located transversely to the portions of each of the optical fibers extending beyond the substrate.

* * * * *